United States Patent [19]

Mori et al.

[11] Patent Number: 4,539,335

[45] Date of Patent: Sep. 3, 1985

[54] EXPANDABLE THERMOPLASTIC RESIN PARTICLES AND PROCESS FOR PREPARING THE SAME

[75] Inventors: Kiyoshi Mori, Kakogawa; Masao Nakagawa, Kobe, both of Japan

[73] Assignee: Kanegafuchi Kagaku Kogyo Kabushiki Kaisha, Osaka, Japan

[21] Appl. No.: 607,261

[22] Filed: May 4, 1984

[30] Foreign Application Priority Data

May 6, 1983 [JP] Japan ................................. 58-79645

[51] Int. Cl.$^3$ .............................................. C08J 9/18
[52] U.S. Cl. ........................................ 521/60; 521/56; 521/147
[58] Field of Search ........................... 521/56, 60, 147

[56] References Cited

U.S. PATENT DOCUMENTS

| Re. 27,927 | 2/1974 | Jablonski | 521/60 |
|---|---|---|---|
| 3,058,929 | 10/1962 | Vanderhoff et al. | 521/56 |
| 3,287,286 | 11/1966 | Ohlinger et al. | 521/60 |
| 3,288,731 | 11/1966 | Ingram et al. | 521/60 |
| 3,441,524 | 4/1969 | Burger et al. | 521/60 |
| 3,462,380 | 8/1969 | Ronden et al. | 521/56 |
| 3,505,248 | 4/1970 | Banks et al. | 521/60 |
| 3,736,273 | 5/1973 | Kobe et al. | 521/60 |
| 3,994,840 | 11/1976 | Kajimura et al. | 521/60 |
| 3,994,841 | 11/1976 | Ikeda et al. | 521/60 |
| 4,080,344 | 3/1978 | Ikeda et al. | 521/60 |

FOREIGN PATENT DOCUMENTS 1094315 5/1965 United Kingdom .
1249506 10/1971 United Kingdom .

*Primary Examiner*—Morton Foelak
*Attorney, Agent, or Firm*—Antonelli, Terry & Wands

[57] ABSTRACT

Expandable thermoplastic resin particles having excellent heat resistance, solvent resistance, foamability and moldability comprising a copolymer of 10 to 80% by weight of α-methylstyrene, 5 to 50% by weight of acrylonitrile and 0 to 70% by weight of at least one member selected from the group consisting of styrene, methyl methacrylate, vinyl toluene and t-butylstyrene, and an expanding agent impregnated in the copolymer, prepared easily in high conversions by an aqueous suspension polymerization using particular difunctional organic peroxides, preferably those capable of producing t-butoxy radicals, followed by impregnation of the produced polymer particles with the expanding agent.

9 Claims, No Drawings

EXPANDABLE THERMOPLASTIC RESIN PARTICLES AND PROCESS FOR PREPARING THE SAME

BACKGROUND OF THE INVENTION

The present invention relates to expandable thermoplastic resin particles, and more particularly to expandable particles of an α-methylstyrene/acrylonitrile polymer having excellent heat resistance, solvent resistance, expandability and moldability and an industrially advantageous process for preparing the expandable particles.

Expandable polystyrene particles are well known expandable thermoplastic particles. Foamed articles can be readily and inexpensively obtained by heating the particles in a mold. However, since the raw material is a polystyrene, the foamed articles are not suitable for use requiring the heat resistance, such as a heat insulating material for pipes of a relatively high temperature, a heat insulating material for roofs, automobile parts or a heat insulating material for solar systems. In particular, in case of using the polystyrene foamed articles as automobile parts in the form of laminates with other materials, selection of adhesives is difficult, because of poor solvent resistance.

It is expected that a copolymer containing at least 10% by weight, especially at least 20% by weight, of α-methylstyrene and at least 5% by weight of acrylonitrile has heat resistance and solvent resistance sufficient for practical use. Thus, expandable thermoplastic resin particles having good heat and solvent resistances would be obtained by impregnating an expanding agent such as volatile liquid in the resin.

When it is desired to prepare a copolymer containing a large amount of α-methylstyrene by suspension polymerization to obtain a copolymer having an excellent heat resistance, a process using as a polymerization initiator an organic peroxide such as t-butyl peroxybenzoate, t-butyl peroxyacetate or di-t-butyl peroxide is adoptable. However, in a process using such initiators, it is necessary to use a large amount of the initiators regardless of the polymerization temperature. Consequently, an α-methylstyrene/acrylonitrile copolymer prepared by such a process is very low in the degree of polymerization, and the expandable particles obtained by impregnating an expanding agent in the copolymer is very poor in foamability. Accordingly, not only satisfactory foamed articles are hard to obtain, but also the foamed articles are low in strength. On the other hand, in case of using these initiators in a decreased amount for the purpose of raising the degree of polymerization, the so-called dead end polymerization occurs, thus a high conversion as required in industrial production is not obtained and, therefore, it is difficult to obtain satisfactory foamed articles. Also, when a general organic peroxide such as benzoyl peroxide is used in the suspension polymerization, the copolymer is not obtained in an industrially satisfactory high conversion even at an optimum temperature for the peroxide.

Like this, the α-methylstyrene/acrylonitrile copolymers prepared by a conventional suspension polymerization process cannot provide the desired expandable thermoplastic resin particles, or even if obtained, the productivity is very low.

On the other hand, an emulsion polymerization process is known as a process for preparing an α-methylstyrene/acrylonitrile copolymer having a high degree of polymerization in a high conversion. However, the preparation of expandable particles from the so prepared α-methylstyrene/acrylonitrile copolymer must be made by coagulating the copolymer from the emulsion, pelletizing the copolymer and then impregnating an expanding agent in the pellets. Not only the process is very complicated, thus resulting in rise of preparation cost, but also the obtained particles are poor in foamability and strength because large amounts of an emulsifier and a coagulating agent are incorporated in the particles.

It is an object of the present invention to provide expandable particles of α-methylstyrene/acrylonitrile copolymers having excellent heat resistance, solvent resistance, foamability and moldability.

Another object of the invention is to provide a process for preparing expandable particles of α-methylstyrene/acrylonitrile copolymers having excellent properties in high conversions by a suspension polymerization technique.

These and other objects of the present invention will become apparent from the description hereinafter.

SUMMARY OF THE INVENTION

In accordance with the present invention, there is provided an expandable thermoplastic resin particle comprising a thermoplastic resin and 2 to 15% by weight of an expanding agent, said thermoplastic resin consisting essentially of 10 to 80% by weight of α-methylstyrene, 5 to 50% by weight of acrylonitrile and 0 to 70% by weight of at least one member selected from the group consisting of styrene, methyl methacrylate, vinyl toluene and t-butylstyrene.

The expandable particles are prepared by suspension-polymerizing 10 to 80% by weight of α-methylstyrene, 5 to 50% by weight of acrylonitrile and 0 to 70% by weight of at least one member selected from the group consisting of styrene, methyl methacrylate, vinyl toluene and t-butylstyrene in the presence of a difunctional organic peroxide as an initiator at a temperature of 80° C. to 130° C., and impregnating an expanding agent in the produced polymer particles during or after the polymerization.

DETAILED DESCRIPTION

The amount of α-methylstyrene used in the present invention is selected from 10 to 80% by weight based on the total weight of the monomers according to the desired heat resistance and the expansion ratio. When the amount of α-methylstyrene is less than 10% by weight, the heat resistance is not improved. When the amount is more than 80% by weight, the polymerization conversion is lowered and a large amount of the monomers remains in the produced polymer, thus the heat resistance is rather lowered. When it is desired that the expanded moldings with an expansion ratio of 50 are resistant to heat of 100° C., it is preferable to use α-methylstyrene in an amount of 20 to 50% by weight. When it is desired that the expanded moldings with an expansion ratio of 5 to 10 are resistant to heat of 110° C., it is preferable to use α-methylstyrene in an amount of 50 to 80% by weight.

The use of acrylonitrile is necessary for raising the polymerization conversion and for imparting the oil resistance to the polymer. The amount of acrylonitrile is selected from 5 to 50% by weight based on the total weight of the monomers used. When the amount is less than 5% by weight, the conversion is low and also the oil resistance is not sufficiently exhibited. Also, the use of acrylonitrile in an amount of more than 50% by weight should be avoided, since a further increase in polymerization conversion is not obtained and the produced polymer is colored in yellowish brown.

One or more kinds of other monomers than α-methylstyrene and acrylonitrile may be employed in the invention, e.g. styrene, methyl methacrylate, vinyl toluene and t-butylstyrene. These other monomers are employed in an amount of at most 70% by weight based on the total weight of the monomers used.

The expanding agent used in the present invention include, for instance, an aliphatic hydrocarbon such as propane, butane, pentane or hexane, an alicyclic compound such as cyclobutane, cyclopentane or cyclohexane, a halogenated hydrocarbon such as trichlorofluoromethane, dichlorofluoromethane, dichlorodifluoromethane, methyl chloride, dichlorotetrafluoroethane or ethyl chloride and the like. The amount of the expanding agent varies depending on the expansion ratio of the expanded moldings to be produced. The expanded moldings with an expansion ratio of 2 to 100 can be obtained by incorporating 2 to 15% by weight of the expanding agent into the polymer particles.

A suspension polymerization process is adopted to the preparation of the expandable thermoplastic resin particles of the invention. As stated before, an emulsion polymerization process is inferior to the suspension polymerization because of cost up owing to complicated process and deterioration of quality owing to incorporation of an emulsifier and a coagulating agent. Also, a bulk polymerization process is disadvantageous, since the impregnation of an expanding agent must be made after pelletizing the product obtained by the polymerization.

Known dispersing agents can be used in the present invention. The dispersing agents include, for instance, organic dispersing agents such as polyvinyl alcohol, polyvinyl pyrrolidone and methyl cellulose, and inorganic dispersing agents such as calcium phosphate, magnesium phosphate, sodium silicate, zinc oxide and magnesium carbonate. In the case of the inorganic dispersing agents, the combination use thereof with anionic surface active agents such as sodium alkylbenzenesulfonates and sodium α-olefinsulfonates is effective in increasing the dispersing effect.

The selection of the polymerization initiators used in the present invention is particularly important in efficiently obtaining the polymer having a high degree of polymerization in a high polymerization conversion. In case that the polymerization conversion is low and more than 5% by weight of the monomers remain in the produced polymer, no satisfactory expanded moldings are obtained, or even if obtained with difficulty, the heat resistance is very bad. In the present invention, difunctional organic peroxides are employed as polymerization initiators in such a point of view. The term "difunctional peroxides" as used herein means peroxides having two —$O_2$— groups capable of producing radicals. Preferably, difunctional organic peroxides having a 10 hour half-life temperature of 60° to 120° C., especially those capable of producing a t-butoxy radical, are employed in the present invention. The term "10 hour half-life temperature" as used herein means the temperature at which 10 hours are required in reducing the concentration of an initiator by half by the thermal decomposition. Typical examples of the initiators used in the invention are, for instance, di-t-butyl peroxyhexahydroterephthalate, 1,1-di-t-butylperoxy-3,3,5-trimethylcyclohexane, di-t-butyl peroxyazelate, 2,5-dimethyl-2,5-bis(2-ethylhexanoylperoxy)hexane, 1,1-di-t-butylperoxycyclohexane, 1,3-bis(t-butylperoxyisopropyl)benzene, 2,2-di(t-butylperoxy)butane, n-butyl ester of 4,4-di-t-butylperoxyvaleric acid, di-t-butyl peroxytrimethyladipate, and the like. These initiators may be employed alone or in admixture thereof. These initiators may also be employed in combination with other general initiators such as benzoyl peroxide, t-butyl peroxide and dicumyl peroxide.

The initiator is employed in an amount of 0.1 to 2.0% by weight based on the total weight of the monomers used. When the amount of the initiator is less than 0.1% by weight, no industrially practical conversion is obtained, or a very long time is required in polymerization, thus resulting in lowering of productivity. When the amount is more than 2.0% by weight, a copolymer is obtained in high conversions in a short time, but the molecular weight is low, and accordingly the foaming cannot be satisfactorily conducted, or even if conducted, the strength of the obtained foams is extremely low.

It cannot be expected from conventional knowledges and techniques that the expandable particles of α-methylstyrene/acrylonitrile copolymers having a high quality are efficiently obtained by a suspension polymerization using the specific difunctional organic peroxide, preferably the difunctional organic peroxides capable of producing a t-butoxy radical, followed by impregnation of an expanding agent into the polymer particles. The reason is not made clear.

The polymerization temperature is selected from 80° to 130° C. When the temperature is lower than 80° C., the conversion is low, and when the temperature is higher than 130° C., the molecular weight of the produced polymer is lowered and satisfactory expanded moldings are hard to obtain.

The expanding agent can be added to the polymerization system during the polymerization or after the polymerization to impregnate the polymer particles therewith.

When highly expanded moldings are desired, it is preferable to incorporate in the expandable particles a solvent such as toluene, xylene, ethylbenzene, heptane or octane or a plasticizer such as phthalic acid esters or adipic acid esters. The incorporation of the solvent or plasticizer can be made, for instance, by a process in which it is previously admixed with the monomers and the polymerization is then conducted, and a process in which it is impregnated in the polymer particles at the same time of the impregnation with the expanding agent. The content of the solvent or plasticizer in the polymer particles is at most 2% by weight, preferably 0.5 to 2% by weight.

Expanded moldings of desired shape having an excellent heat resistance can be obtained from the expandable particles of the present invention, for instance, by pre-expanding the particles by means of a heat medium such as steam or hot air, filling the pre-expanded particles in a mold which is able to close, but unable to seal, and then heating the particles by means of a heat medium such as steam.

The present invention is more specifically described and explained by means of the following Examples, in which all parts are by weight unless otherwise noted. It is to be understood that the present invention is not limited to the Examples, and various changes and modifications may be made in the invention without departing from the spirit and scope thereof.

EXAMPLE 1

An autoclave equipped with a stirrer was charged with 100 parts of demineralized water, 0.2 part of calcium phosphate and 0.003 part of sodium dodecylbenzenesulfonate. A monomer mixture consisting of 30 parts of α-methylstyrene, 20 parts of acrylonitrile and 50 parts of styrene was admixed with 1.0 part of toluene and 0.3 part of 1,1-di-t-butylperoxy-3,3,5-trimethylcyclohexane, and the mixture was added to the autoclave. The polymerization was carried out at 100° C. for 8 hours with stirring. The polymerization conversion was 99.5%. To the reaction mixture was added 10 parts of butane as an expanding agent, and the impregnation was carried out at 100° C. for 8 hours to give expandable thermoplastic resin particles (hereinafter referred to as "resin A").

The resin A was heated by steam to pre-expand in an apparent expansion ratio of 50. The pre-expanded resin A was filled in a mold which was able to close, but unable to seal, and heated by steam to give a sheet-like foam having a size of 45 cm.×30 cm.×2 cm. The foam was allowed to stand in a hot air circulating dryer at 100° C. for one week, and the dimensional change (percentage of change in dimension to the original dimension). Also, the foam was immersed in toluene at room temperature for 1 hour, and the state of the foam was observed.

The results are shown in Table 1.

EXAMPLES 2 TO 4

The procedures of Example 1 were repeated except that the monomer shown in Table 1 was employed to give expandable particles (resins B, C and D) and foams were prepared therefrom.

The results are shown in Table 1.

Comparative Examples 1 to 4

The procedures of Example 1 were repeated except that the monomer shown in Table 1 was employed to give expandable particles (resins E, F, G and H) and foams were prepared therefrom. The results are shown in Table 1.

TABLE 1

|  | Resin | Monomer composition (part) | | | Conversion (wt %) | Dimensional change (%) | State after immersion in toluene |
|---|---|---|---|---|---|---|---|
|  |  | α-Methylstyrene | Acrylonitrile | Styrene |  |  |  |
| Ex. 1 | A | 30 | 20 | 50 | 99.5 | +1.5 | swelling |
| Ex. 2 | B | 40 | 20 | 40 | 98.7 | +0.7 | swelling |
| Ex. 3 | C | 50 | 30 | 20 | 99.1 | ±0 | no change |
| Ex. 4 | D | 60 | 30 | 10 | 98.9 | ±0 | no change |
| Com. Ex. 1 | E | 0 | 0 | 100 | 99.5 | −53.0 | dissolution |
| Com. Ex. 2 | F | 30 | 0 | 70 | 75.0 | (Foaming was impossible.) | |
| Com. Ex. 3 | G | 100 | 0 | 0 | 5.0 | (Polymerization did not proceed.) | |
| Com. Ex. 4 | H | 0 | 100 | 0 | 98.2 | −62.0 | no change |

EXAMPLES 5 TO 7

The procedures of Example 1 were repeated except that the kind and amount of the initiator were changed as shown in Table 2 to give expandable particles (resins I, J and K).

The results are shown in Table 2.

Comparative Examples 5 and 6

The procedures of Example 1 were repeated except that benzoyl peroxide was used as an initiator in amounts as shown in Table 2 to give expandable particles (resins L and M).

The results are shown in Table 2.

TABLE 2

|  | Resin | Initiator | | Conversion (wt %) | Dimensional change (%) | State after immersion in toluene |
|---|---|---|---|---|---|---|
|  |  | Kind | Amount (part) |  |  |  |
| Ex. 5 | I | Di-t-butyl peroxyhexahydroterephthalate | 0.3 | 99.5 | +0.2 | swelling |
| Ex. 6 | J | Di-t-butyl peroxyhexahydroterephthalate | 0.5 | 99.7 | +0.1 | swelling |
| Ex. 7 | K | Di-t-butyl peroxyazelate | 0.3 | 98.8 | +0.7 | swelling |
| Com. Ex. 5 | L | Benzoyl peroxide | 0.5 | 73.6 | (Foaming was impossible.) | |
| Com. Ex. 6 | M | Benzoyl peroxide | 1.0 | 93.2 | (Foaming was impossible.) | |

EXAMPLE 8

Expandable particles (resin N) were prepared in the same manner as in Example 1 except that 0.3 part of di-t-butyl peroxyhexahydroterephthalate and 0.2 part of 1,1-di-t-butylperoxy-3,3,5-trimethylcyclohexane were employed as an initiator. The polymerization conversion was 99.7%.

A foam was prepared in the same manner as in Example 1. The dimensional change after allowing to stand at 100° C. for 7 days was +0.1%. The foam immersed in toluene at room temperature for 1 hour was in a slightly swollen state.

EXAMPLE 9

An autoclave equipped with a stirrer was charged with 100 parts of demineralized water, 0.3 part of calcium phosphate and 0.005 part of sodium dodecylbenzenesulfonate. A monomer mixture consisting of 60 parts of α-methylstyrene, 30 parts of acrylonitrile and 10 parts of styrene was admixed with 0.75 part of di-t-butyl peroxyhexahydroterephthalate. The mixture was added to the autoclave, and the polymerization was carried out at 100° C. for 10 hours with stirring. The polymerization conversion was 99.1%. To the reaction mixture was added 5 parts of butane as an expanding agent, and the impregnation of butane into the polymer particles was carried out at 115° C. for 6 hours.

The thus prepared expandable particles were heated by steam to pre-expand in an apparent expansion ratio of 5. The pre-expanded particles were filled in a mold which was able to close, but unable to seal, and heated by steam to give a sheet-like foam having a size of 45 cm.×30 cm.×0.7 cm. The expansion ratio was 5.1. The dimensional change of the foam allowed to stand at 110° C. for a day to the original dimension was +0.3%.

In addition to the ingredients used in the Examples, other ingredients can be used in the Examples as set forth in the specification to obtain substantially the same results.

What we claim is:

1. An expandable thermoplastic resin particle comprising a thermoplastic resin and 2 to 15% by weight of an expanding agent, said thermoplastic resin being prepared by suspension-polymerizing 10 to 80% by weight of α-methylstyrene, 5 to 50% by weight of acrylonitrile and 0 to 70% by weight of at least one other monomer selected from the group consisting of styrene, methyl methacrylate, vinyl toluene and t-butystyrene in the presence of a difunctional organic peroxide as an initiator at a temperature of 80° to 130° C.

2. The expandable particle of claim 1, further containing 0.5 to 2.0% by weight of a solvent or a plasticizer.

3. A process for preparing expandable thermoplastic resin particles which comprises suspension-polymerizing 10 to 80% by weight of α-methylstyrene, 5 to 50% by weight of acrylonitrile and 0 to 70% by weight of at least one other monomer selected from the group consisting of styrene, methyl methacrylate, vinyl toluene and t-butylstyrene in the presence of a difunctional organic peroxide as an initiator at a temperature of 80° to 130° C., and impregnating an expanding agent in the produced polymer particles during or after the polymerization.

4. The process of claim 3, wherein said difunctional organic peroxide is a peroxide capable of producing a t-butoxy radical.

5. The process of claim 3, wherein said difunctional organic peroxide is a member selected from the group consisting of di-t-butyl peroxyhexahydroterephthalate, di-t-butyl peroxyazelate and 1,1-di-t-butylperoxy-3,3,5-trimethylcyclohexane.

6. The process of claim 3, wherein a solvent or plasticizer is added to the polymerization system before starting the polymerization in an amount such that the content thereof in the produced polymer particles is from 0.5 to 2.0% by weight.

7. The process of claim 3, wherein a solvent or plasticizer is added to the reaction mixture at the time of impregnating the expanding agent after the completion of the polymerization in an amount such that the content thereof in the produced polymer particles is from 0.5 to 2.0% by weight.

8. The process of claim 3, wherein the amount of difunctional organic peroxide present is from 0.1 to 2.0% by weight based on the total weight of monomers.

9. The expandable particle of claim 1, wherein the amount of difunctional organic peroxide present during the suspension-polymerization is from 0.1 to 2.0% by weight based on the total weight of monomers.

* * * * *